(12) United States Patent
Lee et al.

(10) Patent No.: US 12,191,543 B2
(45) Date of Patent: Jan. 7, 2025

(54) INTEGRATED PRODUCTION OF HYDROGEN, ELECTRICITY, AND HEAT

(71) Applicant: Saudi Arabian Oil Company, Dhahran (SA)

(72) Inventors: Kunho Lee, Dhahran (SA); Aadesh Harale, Dhahran (SA); Thang Pham, Dhahran (SA); Aqil Jamal, Dhahran (SA); Ahmad O. Khowaiter, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 194 days.

(21) Appl. No.: 17/191,992

(22) Filed: Mar. 4, 2021

(65) Prior Publication Data
US 2022/0285712 A1   Sep. 8, 2022

(51) Int. Cl.
*H01M 8/0612* (2016.01)
*B01D 53/04* (2006.01)
(Continued)

(52) U.S. Cl.
CPC .......... *H01M 8/0618* (2013.01); *B01D 53/04* (2013.01); *B01D 53/229* (2013.01);
(Continued)

(58) Field of Classification Search
CPC ............. H01M 8/0618; H01M 8/1231; H01M 8/04014; H01M 8/0687; B01D 53/04;
(Continued)

(56) References Cited

U.S. PATENT DOCUMENTS 5,217,506 A * 6/1993 Edlund ............... C07C 1/04
                                                       95/56
6,043,288 A * 3/2000 DeGeorge ........... B01J 23/75
                                                       518/700
(Continued)

FOREIGN PATENT DOCUMENTS

EP      1683216       7/2006
KR    101531291       7/2015
(Continued)

OTHER PUBLICATIONS

PCT International Search Report and Written Opinion in International Appln. No. PCT/US2022/018877, dated May 31, 2022, 16 pages.
(Continued)

*Primary Examiner* — Matthew J Merkling
(74) *Attorney, Agent, or Firm* — Fish & Richardson P.C.

(57) ABSTRACT

A method and a system for the coproduction of hydrogen, electrical power, and heat energy. An exemplary method includes desulfurizing a feed stream to form a desulfurized feed stream, reforming the desulfurized feed stream to form a methane rich gas, and providing the methane rich gas to a membrane separator. A hydrogen stream is produced in a permeate from the membrane separator. A retentate stream from the membrane separator is provided to a solid oxide fuel cell (SOFC). Electrical power is produced in the SOFC from the retentate stream.

16 Claims, 5 Drawing Sheets

(51) Int. Cl.

| | |
|---|---|
| *B01D 53/22* | (2006.01) |
| *B01D 71/02* | (2006.01) |
| *B01J 23/745* | (2006.01) |
| *B01J 23/755* | (2006.01) |
| *C01B 3/48* | (2006.01) |
| *C01B 3/50* | (2006.01) |
| *C01B 3/56* | (2006.01) |
| *H01M 8/04014* | (2016.01) |
| *H01M 8/0662* | (2016.01) |
| *H01M 8/12* | (2016.01) |
| *H01M 8/1231* | (2016.01) |

(52) U.S. Cl.
CPC ......... *B01D 71/021* (2013.01); *B01D 71/022* (2013.01); *B01D 71/028* (2013.01); *B01J 23/745* (2013.01); *B01J 23/755* (2013.01); *C01B 3/48* (2013.01); *C01B 3/501* (2013.01); *C01B 3/56* (2013.01); *H01M 8/04014* (2013.01); *H01M 8/0675* (2013.01); *H01M 8/0687* (2013.01); *H01M 8/1231* (2016.02); *B01D 2256/16* (2013.01); *B01D 2257/302* (2013.01); *C01B 2203/0233* (2013.01); *C01B 2203/0283* (2013.01); *C01B 2203/066* (2013.01); *C01B 2203/0894* (2013.01); *C01B 2203/1058* (2013.01); *C01B 2203/1241* (2013.01); *C01B 2203/127* (2013.01); *C01B 2203/84* (2013.01); *H01M 2008/1293* (2013.01)

(58) Field of Classification Search
CPC .. B01D 53/229; B01D 71/021; B01D 71/022; B01D 71/028; B01D 23/745; B01D 23/755; B01D 2256/16; B01D 2257/302; C01B 3/48; C01B 3/56; C01B 2203/0233; C01B 2203/0283; C01B 2203/066; C01B 2203/0894; C01B 2203/1058; C01B 2203/1241; C01B 2203/127; C01B 2203/84

See application file for complete search history.

(56) References Cited

U.S. PATENT DOCUMENTS

| | | |
|---|---|---|
| 6,841,279 B1 | 1/2005 | Foger et al. |
| 9,624,913 B2 | 4/2017 | Friesth |
| 9,917,320 B2 | 3/2018 | Thornton et al. |
| 10,008,730 B2 | 6/2018 | Jamal et al. |
| 10,283,795 B2 | 5/2019 | Jamal et al. |
| 2005/0158594 A1 | 7/2005 | Ahmed |
| 2005/0207970 A1 | 9/2005 | Garg et al. |
| 2005/0209348 A1 | 9/2005 | Bowe |
| 2006/0008413 A1* | 1/2006 | Garg ............... C01B 3/40 502/328 |
| 2006/0183009 A1* | 8/2006 | Berlowitz ............ G06F 1/184 429/429 |
| 2006/0260189 A1 | 11/2006 | Reddy et al. |
| 2010/0122552 A1 | 5/2010 | Schwartz et al. |
| 2011/0099969 A1* | 5/2011 | Ku ............... C01B 3/12 60/39.12 |
| 2012/0039794 A1* | 2/2012 | Catchpole ............ C01B 3/382 423/652 |
| 2013/0126038 A1* | 5/2013 | Jamal ............ C01B 3/384 429/411 |
| 2013/0197285 A1* | 8/2013 | Shafi ............ C10G 45/44 208/57 |
| 2014/0066527 A1 | 3/2014 | Gaucher et al. |
| 2016/0297727 A1* | 10/2016 | Modarresi .......... H01M 8/0637 |
| 2017/0207472 A1 | 7/2017 | Jamal et al. |
| 2018/0261861 A1 | 9/2018 | Jamal et al. |

FOREIGN PATENT DOCUMENTS

| | | | |
|---|---|---|---|
| KR | 101828938 | 2/2018 | |
| WO | WO-2011075845 A1 * | 6/2011 | ............. B01J 23/63 |
| WO | WO 2020118420 | 6/2020 | |

OTHER PUBLICATIONS

U.S. Appl. No. 61/562,189, filed Nov. 21, 2011, Lee et al.
FuelCell Energy "Air Products and FuelCell Energy Begin Construction of High Efficiency Hydrogen Energy Station Demonstration for Combined Hydrogen, Electricity and Heat Generation" System Designed to Address Industrial and Transportation Applications, Mar. 2007, 5 pages.
Leo, "Tri-Generation Fuel Cells: Opening Doors to Distributed Hydrogen Markets," CryoGas International, Jul. 2016, 3 pages.
Malico et al., "Design of a trigeneration system using a high-temperature fuel cell," International journal of energy research, Special Issue: The changing energy paradigm, challenges and new developments, Feb. 2009, 33:2, 144-151, 8 pages.
Manliclic et al., "Tri-Generation Fuel Cell Technologies for Location-Specific Applications," AN047, Advanced Power and Energy Program, Jun. 17, 2014, 19 pages.
Perez-Fortes et al., "Design of a Pilot SOFC System for the Combined Production of Hydrogen and Electricity under Refueling Station Requirements," Fuel Cells, 2019, 19:4, 389-407, 19 pages.
Yu et al., "Combined Hydrogen, Heat and Power (CHHP) pilot plant design," International Journal of Hydrogen Energy, Apr. 22, 2013, 38:12 4881-4888, 8 pages.

* cited by examiner

INTEGRATED PRODUCTION OF HYDROGEN, ELECTRICITY, AND HEAT

BACKGROUND

A steadily increasing amount of carbon dioxide ($CO_2$) in the atmosphere has intensified environmental challenges such as climate change and ocean acidification around the world. CO2 alone accounts for over 75% of all greenhouse gas emissions. In order to slow down the potential negative impact of CO2 on the environment scientific studies are focusing on capturing, converting and sequestering CO2 from sectors that account for most of the emissions such as transport and power generation.

Electrification of transport sector is happening at rapid pace with emergence of hydrogen fuel cell electric vehicles and battery electric vehicles, which allows elimination of point sources of emissions such as passenger and heavy-duty vehicles. Challenges remain specifically in meeting infrastructure requirements for supplying hydrogen and electricity for these new applications. An efficient global hydrocarbon distribution infrastructure already exists in many parts of the world and this invention allows the economic utilization of this infrastructure in addressing new market demands for energy while the hydrogen and electricity infrastructure is established.

SUMMARY

An embodiment described herein provides a method for coproduction of hydrogen, electrical power, and heat energy. The method includes desulfurizing a feed stream to form a desulfurized feed stream, reforming the desulfurized feed stream to form a methane rich gas, and providing the methane rich gas to a membrane separator. A hydrogen stream is produced in a permeate from the membrane separator. A retentate stream from the membrane separator is provided to a solid oxide fuel cell (SOFC). Electrical power is produced in the SOFC from the retentate stream.

Another embodiment described herein provides a trigeneration facility. The trigeneration facility includes a desulfurization unit to remove sulfur from a hydrocarbon feed stream forming a desulfurized feed stream. A pre-reformer is included to convert the desulfurized feed stream to a methane rich gas. A membrane separator is included to remove at least a portion of hydrogen from the methane rich gas in a permeate. A solid oxide fuel cell (SOFC) is included to generate electrical power from a retentate from the membrane separator.

DETAILED DESCRIPTION

The systems described herein address technical, system and infrastructure challenges faced by transport industry that aspires to achieve enhanced efficiency and sustainability. Examples described herein provide a trigeneration facility that includes a desulfurization unit, a pre-reformer, a membrane separator, and a solid oxide fuel cell (SOFC). In the desulfurization unit, sulfur and other impurities are removed from a hydrocarbon feed stream generally having 12 carbon atoms or fewer, for example, with a boiling point of less than about 200° C. The resulting desulfurized stream is treated in a pre-reformer to generate a methane rich gas stream that contains hydrogen.

The reformate from the pre-reformer flows through a membrane separator which removes hydrogen from the reformate. The hydrogen may be used as a zero carbon product for transportation, power generation, and other uses, such as in a chemical plant. A portion of the hydrogen may be used in the desulfurization unit, for example, for hydrodesulfurization. After the removal of at least a portion of the hydrogen the remaining reformate is fed to the SOFC for the generation of electrical power. Heat energy generated in the SOFC may be used in other processes, such as steam generation and the like. At least a portion of the heat energy may be used to heat the remaining reformate stream to the operating temperature of the SOFC prior to introducing it to the SOFC. A waste stream from the SOFC, including CO2, can be purified for use in CO2 conversion processes or sequestration.

In the facility, the hydrocarbon feed stream is directly processed to generate electrical power, hydrogen, and heat. In addition to power, these technologies can be used to produce synthetic gases and potentially hydrogen. When targeting low carbon footprint operations, the $CO_2$ in the waste stream is captured, used, or stored.

Figure 1:
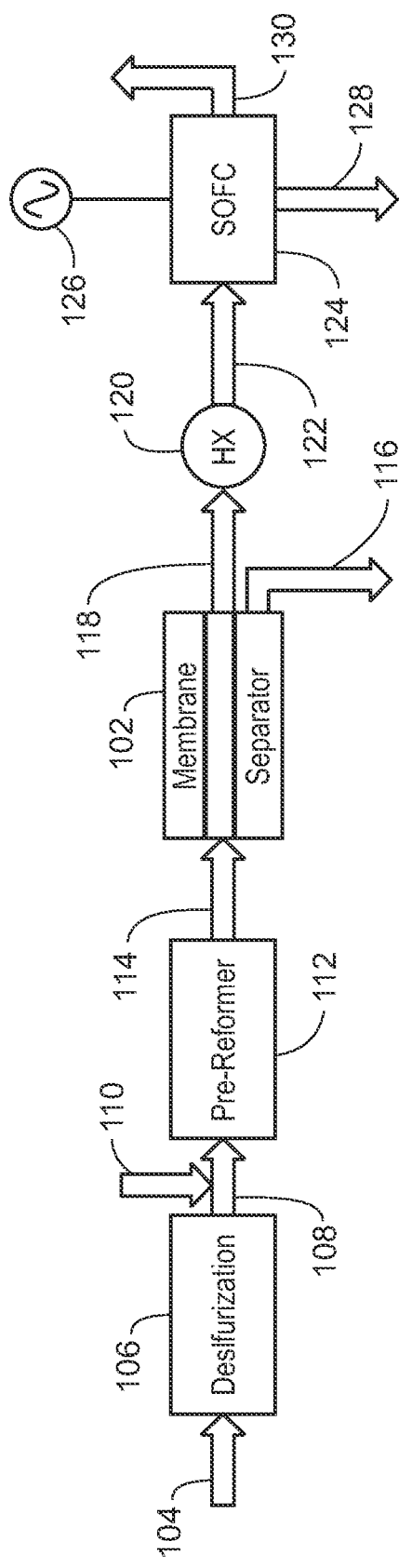
FIG. 1 is a schematic drawing of a trigeneration facility that incorporates a hydrogen membrane separator.

FIG. 1 is a schematic drawing of a trigeneration facility 100 that incorporates a hydrogen membrane separator 102. The trigeneration facility 100 has a hydrocarbon feed 104 that can include any number of light hydrocarbons. In various embodiments, the hydrocarbon feed 104 incudes natural gas, liquefied petroleum gas (city gas), or naphtha with a boiling point range up to 200 degree Celsius.

In the embodiments of FIG. 1, a desulfurization unit 106 removes sulfur and other impurities, for example, in a hydrodesulfurization or hydrodemetallization process. In some embodiments, the desulfurization is performed by adsorbents at ambient temperature. These embodiments may provide simpler operation and maintenance when the amount of sulfur in the gas is relatively low, e.g., less than about 1%, less than about 0.5%, less than about 1500 ppm, less than about 500 ppm, or lower.

In embodiments using a desulfurization catalyst, a hydrogen stream may be provided to the desulfurization unit 106. In the desulfurization unit 106, contaminants such as metals, sulfur, and nitrogen can be removed by passing the hydrocarbon feed 104 through a series of layered catalysts that perform the catalytic functions of one or more of demetallization, desulfurization, and denitrogenation. In some embodiments, the sequence of catalysts to perform hydrodemetallization (HDM) and hydrodesulfurization (HDS) can include a hydrodemetallization catalyst, an intermediate catalyst, a hydrodesulfurization catalyst, and a final catalyst.

An intermediate catalyst can be used to perform a transition between the hydrodemetallization and hydrodesulfurization functions. The intermediate catalyst can have intermediate metal loadings and pore size distribution. The catalyst in the desulfurization unit 106 can be an alumina based support in the form of extrudates, at least one catalytic metal from group VI (for instance, molybdenum, tungsten, or both), or at least one catalytic metals from group VIII (for instance, nickel, cobalt, or both), or a combination of any two or more of them. The catalyst can contain at least one dopant, such as one or more of boron, phosphorous, halogens, and silicon. The intermediate catalyst can have a surface area of between about 140 $m^2/g$ and about 200 $m^2/g$, a pore volume of at least about 0.6 $cm^3/g$, and mesoporous pores sized between about 12 nm and about 50 nm.

The catalyst to perform the desulfurization can include gamma alumina based support materials with a surface area towards the higher end of the HDM range, such as between about 180 $m^2/g$ and about 240 $m^2/g$. The higher surface for the HDS catalyst results in relatively smaller pore volume, such as a pore volume of less than about 1 $cm^3/g$. The catalyst contains at least one element from group VI, such as molybdenum, and at least one element from group VIII, such as nickel. The catalyst also contains at least one dopant, such as one or more of boron, phosphorous, silicon, and halogens. In some examples, cobalt (Co) can be used to provide relatively higher levels of desulfurization. The metals loading for the active phase is higher as the desired activity is higher, such that the molar ratio of Ni:(Ni+Mo) is between about 0.1 and about 0.3 and the molar ratio of (Co+Ni):Mo is between about 0.25 and about 0.85.

As described herein, the desulfurization unit 106 processes the hydrocarbon feed 104 with hydrogen, for example, from the hydrogen membrane separator 102. The hydrogen may be added at 0.1 mol. %, 0.5 mol. %, 1 mol. %, 5 mol. %, or higher, as a proportion of the hydrocarbon feed 104.

The desulfurization unit 106 can operate at a temperature between about 300° C. and about 450° C., such as about 300° C., about 350° C., about 400° C., about 450° C., or another temperature. The desulfurization unit 106 can operate at a pressure between about 30 bar and about 180 bar, such as about 30 bar, about 60 bar, about 90 bar, about 120 bar, about 150 bar, about 180 bar, or another pressure.

The desulfurized stream 108 from the desulfurization unit 106 has steam 110 added before being reformed in a pre-reformer 112, for example, with a Ni based catalyst, among others. As used herein, a pre-reformer generally converts a hydrocarbon stream to a methane rich stream containing $CH_4$, $H_2$, CO, $CO_2$ and steam. A reformer is generally designated to full conversion of a hydrocarbon stream to a synthesis gas containing mainly $H_2$, CO, $CO_2$, steam, and a small amount of $CH_4$.

In the pre-reformer 112, the hydrocarbons are reacted with the steam 110. The pre-reformer 112 can operate at a pressure between about 0.01 bar and about 50 bar, such as about 0.01 bar, about 0.1 bar, about 0.5 bar, about 1 bar, about 5 bar, about 10 bar, about 20 bar, about 30 bar, about 40 bar, about 50 bar, or another pressure. The molar ratio of hydrogen to hydrocarbon at the outlet of the pre-reformer 112 can be between about 1:1 and about 10:1, such as about 1:1, about 2:1, about 4:1, about 6:1, about 8:1, about 10:1, or another ratio. The pre-reformer 112 can operate at a temperature between about 300° C. and about 550° C., such as about 300° C., about 400° C., about 450° C., about 500° C., about 550° C., or another temperature.

The pre-reformer 112 produces a methane rich gas, or reformate 114, in which at least almost all of the $C_2^+$ hydrocarbons have been converted to $C_1$. The reformate 114 from the pre-reformer 112 is passed to the hydrogen membrane separator 102. The hydrogen membrane separator 102 utilizes a hydrogen selective membrane that operates at high temperatures. In some embodiments, the hydrogen membrane separator 102 operates at temperatures that range between about 300° C. and about 550° C. In some embodiments, the hydrogen membrane separator 102 comprises a proton conducting material, which is electrically driven to transport the hydrogen to the permeation side.

In various embodiments, the hydrogen selective membrane includes palladium, palladium alloy, carbon based membranes, or zeolite based membranes. The membrane selectively removes hydrogen, in a permeate stream 116, from the reformate 114. The selection of the membrane may be based on cost, and other factors, such as ease of manufacturing, lifespan, and hydrogen flux.

The hydrogen is further treated, for example, if needed to reach a purity specification for fuel cell applications, such as in vehicles. According to ISO FDIS 1467-2, hydrogen purity is generally, at least, 99.97%. For example, a pressure swing adsorption (PSA) system (not shown) may be included in the trigeneration facility 100 for the purification of hydrogen. In these embodiments, the permeate stream 116 is routed to the PSA system. The PSA system may include two columns filled with a zeolite absorbent, one active column and one regenerating column. The permeate stream 116 is flowed through the active column, which absorbs impurities from the hydrogen flow. In embodiments, the purity of the hydrogen in the permeate stream 116 is greater than about 80 vol. %, greater than about 90 vol. %, greater than about 95 vol. %, or higher. Once impurities start to break through the active column, the flow is switched over to the regenerating column, which then becomes the active column. The previously active column is then regenerated.

After purification, the hydrogen is compressed to 400 to 900 bar as needed for dispensing to fuel cell vehicles. The flow of hydrogen in the permeate stream 116 can be increased through controlling the permeate side pressure or the membrane surface area. As the pressure of 114 is increased, hydrogen flux through the membrane will increase resulting in a higher flow of the permeate stream 116. Alternatively, a higher pressure of reformate 114 coupled with a higher surface area, would also result in a higher flow of the permeate stream 116.

The retentate stream 118 from the membrane separator is routed to an anode side of a solid oxide fuel cell (SOFC) 124. In some embodiments, a heat exchanger 120 is used to adjust the temperature of the retentate stream 118 forming a temperature-controlled stream 122. The temperature of the temperature-controlled stream 122 may be increased to minimize the temperature gradient between the anode and cathode sides, as well as avoiding thermal shock (since the SOFC operates at a much higher temperature). Air, or another oxidizer, is fed to the cathode side of the SOFC 124 and the electrochemical reaction produces electricity 126. Hydrocarbons in the retentate 118 may be further reformed in the SOFC 124 increasing the amount of synthesis gas in the anode exhaust 128. The anode exhaust 128 can be recycled back to the membrane reactor or used to produce heat 130 for preheating the feed streams, such as by flowing through the heat exchanger 120 to increase the temperature of the reformate 118 and form the temperature-controlled stream 122. As the generation of electricity in the SOFC 124 is exothermic, other techniques can be used to remove heat 130 from the SOFC 124. For example, more air in passed through the cathode side of the SOFC 124, or the SOFC 124 may be enclosed in a heat exchanger, or include cooling coils within the SOFC 124 structure, among other techniques. Accordingly, the trigeneration facility 100 allows for the optimization of the production of hydrogen in the permeate stream 116, electricity 126, and heat 130

Figure 2:
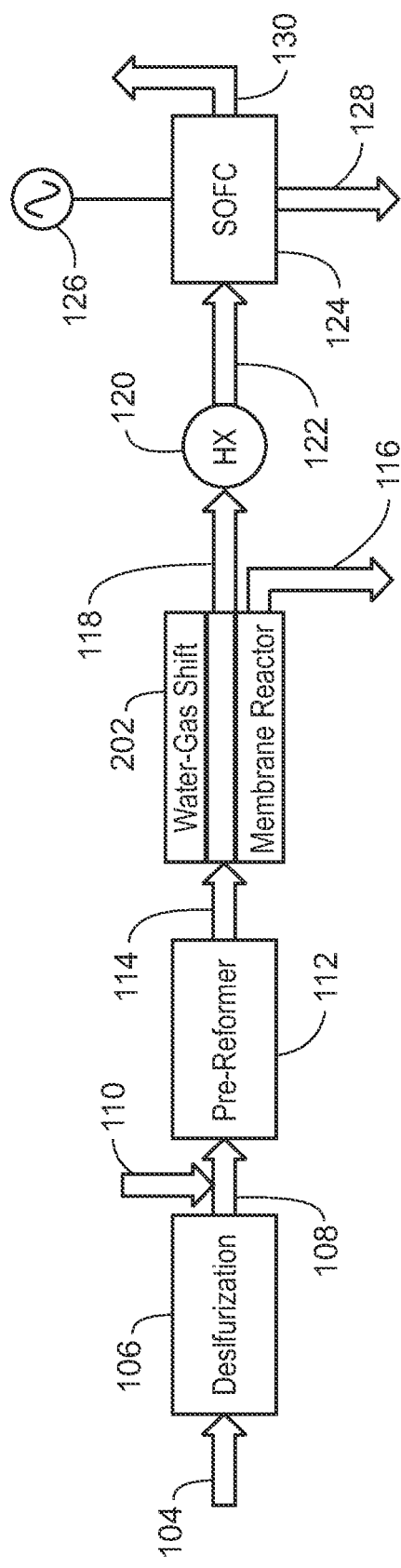
FIG. 2 is a schematic drawing of a trigeneration facility that incorporates a hydrogen membrane separator integrated with a water-gas shift reactor.

FIG. 2 is a schematic drawing of a trigeneration facility 200 that incorporates a hydrogen membrane separator with an integrated water-gas shift reactor. Similar numbered items are as described with respect to FIG. 1. Further, the trigeneration facility 200 of FIG. 2 may also include a PSA system for the purification of hydrogen in the permeate 116.

In this example, the reformate 114 is passed to a membrane reactor 202 in which a water-gas shift catalyst is packed along with a high temperature membrane. In some embodiments, the water-gas shift catalyst may be a high temperature iron-oxide based or intermediate-low temperature copper oxide based catalysts. The presence of the water-gas shift catalyst allows the conversion of carbon monoxide in the reformate 114 to hydrogen and CO2.

Figure 3:
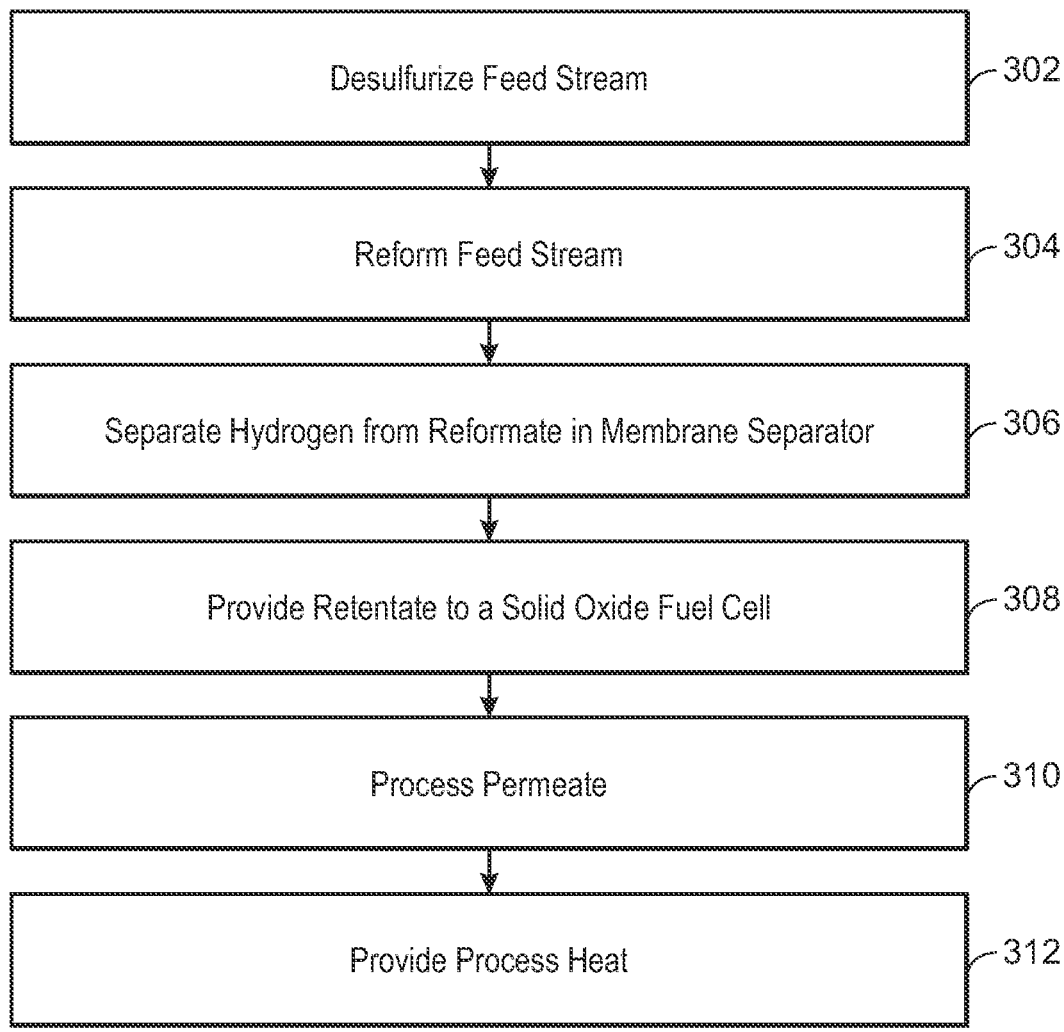
FIG. 3 is a flowchart of a process for using a hydrocarbon feed stream to produce hydrogen, electricity, and heat in a trigeneration facility that incorporates a hydrogen membrane separator.

FIG. 3 is a flowchart of a method 300 for using a hydrocarbon feed stream to produce hydrogen, electricity, and heat in a trigeneration facility that incorporates a hydrogen membrane separator. The method 300 begins at block 302, with the desulfurization of the hydrocarbon feed stream. As described herein, this may be performed using a desulfurization catalyst or, if the amount of sulfur is low, using adsorbents. In various embodiments, the adsorbents include activated carbon, $CuO/ZnO/Al_2O_3$, Ag-zeolite, or $Ag/CeO_2$, among others. The adsorbents do not need to be operated at high temperatures, but may be operated at ambient temperatures, such as between about 5° C. and about 50° C. Selection of the adsorbents is dependent on the sulfur compounds and type of hydrocarbon feedstock. For example, different adsorbents may be used for $H_2S$, COS, heteroatom hydrocarbons that contain sulfur, and the like. The low temperature techniques are economical for small scale and simplified maintenance, e.g. replacing a cartridge of sulfur adsorbents in a passenger vehicle.

At block 304, the desulfurized feed stream is reformed, for example, in a pre-reformer. Steam is added to the desulfurized feed stream upstream of the pre-reformer.

At block 306, hydrogen is separated from the reformate in a membrane separator as a permeate stream. As described herein, the membrane separator may be run at an elevated temperature.

At block 308, a retentate stream from the membrane separator is provided to the anode of an SOFC. In the SOFC, electricity is generated from the retentate stream and an oxidizer stream provided to the cathode. A portion of the anode exhaust stream may be recycled back to be blended with the desulfurized feed stream, at block 304, supplying the required steam to the pre-reformer or may be processed for sequestration of carbon dioxide or may be processed to recover the remaining fuel value for heat.

At block 310, the permeate stream may be processed to purify the hydrogen, for example for use in transportation applications. The purification may be performed in a pressure swing adsorption, among others.

At block 312, process heat from the SOFC is provided to other process units, such as a heat exchanger used to increase the temperature of the retentate stream prior to providing the retentate stream to the anode of the SOFC. In other embodiments, the process heat is used to generate steam for chemical plant.

Figure 4:
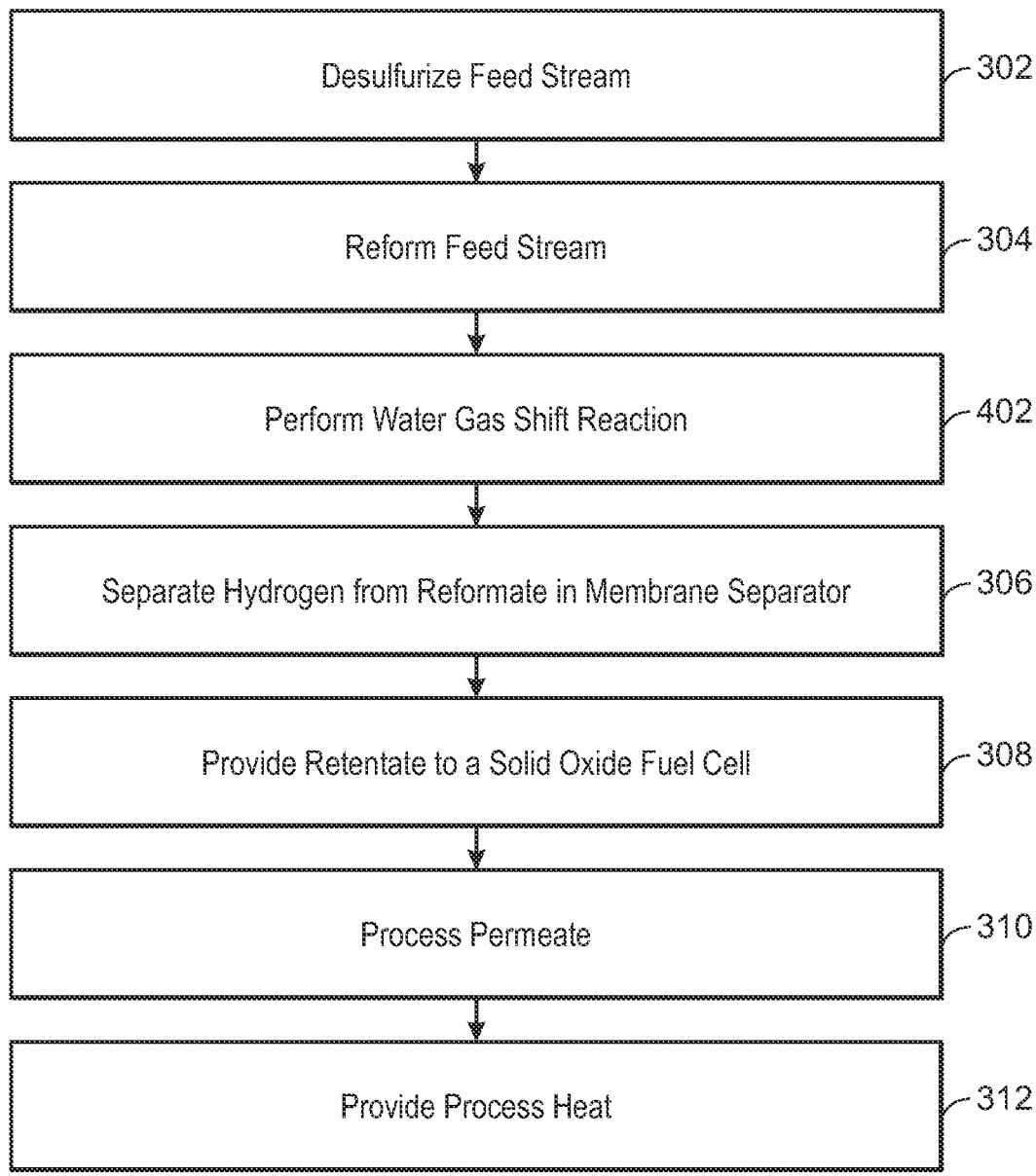
FIG. 4 is a flowchart of a process for using a hydrocarbon feed stream to produce hydrogen, electricity, and heat in a trigeneration facility that incorporates a hydrogen membrane separator integrated with a water-gas shift reactor.

FIG. 4 is a flowchart of a method 400 for using a feed stream to produce hydrogen, electricity, and heat in a trigeneration facility that incorporates a hydrogen membrane separator with an integrated water-gas shift reactor. Like numbered items are as described with respect to FIG. 3. In this method 400, at block 402, a water-gas shift reaction is performed on the reformate prior to or during the separation of the hydrogen. In some embodiments, a water-gas shift catalyst is included in the membrane separator to increase the yield of hydrogen and $CO_2$.

EXAMPLES

Process Simulations

Process models were built using Aspen plus (version 10) for the embodiments described with respect to FIGS. 1 and 2, and all the components of the process are modeled to determine the mass and energy flows. These process models contain detailed routing of various streams that can satisfy the pre-heating or cooling of process streams by matching the available heat contents of hot streams with pre-heating heat load requirements of components of the process. They also represent how the hydrogen selective membrane in the hydrogen membrane separators 102 and 202 and the SOFC 124 can be represented on Aspen plus modeling platform as these embodiments are not standard, "plug-and-play" modeling modules in Aspen plus library.

Figure 5:
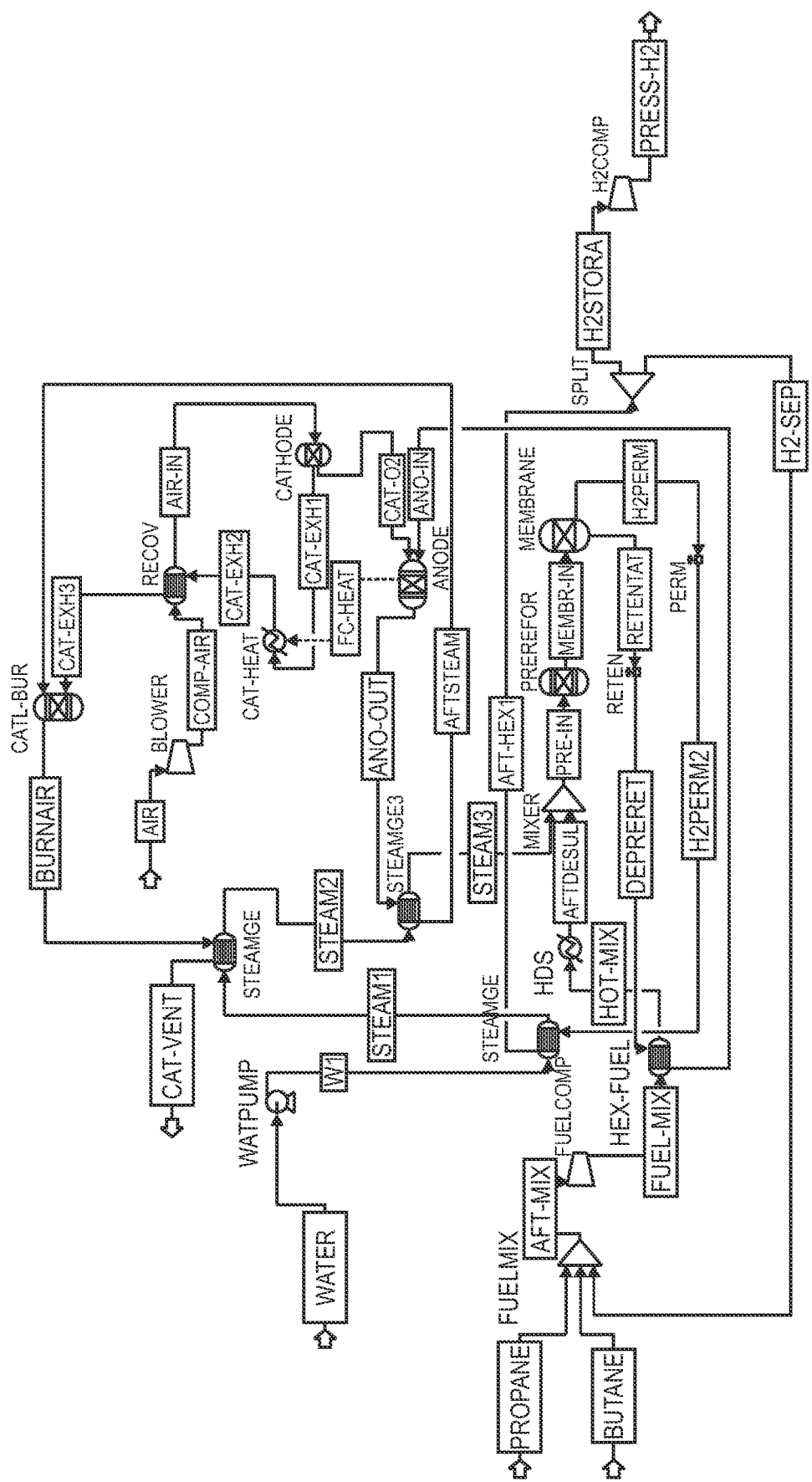
FIG. 5 is a simplified process model of a trigeneration facility that incorporates a hydrogen membrane separator.

FIG. 5 is a simplified process model 500 of a trigeneration facility that incorporates a hydrogen membrane separator. The results of the modeling for S/C=3 are shown in Tables 1 to 3. The results of the modeling for S/C=4 are shown in Tables 4 to 6. S/C is a steam to carbon ratio and defined as the molar flowrate of steam over the molar flowrate of hydrocarbon feed times its carbon number; for example for a given S/C=3, the molar flowrate of steam divided by the sum of the molar flowrate propane times 3 and the molar flowrate of butane times 4 equals 3.

TABLE 1

| Pre-reformer operation at S/C = 3 | | | |
|---|---|---|---|
| | Units | PRE-IN | MEMBR-IN |
| Temperature | C. | 563.06 | 494.23 |
| Pressure | bar | 10.00 | 10.00 |
| Mole Flows | | | |
| WATER | mol/min | 137.75 | 109.58 |
| H2 | mol/min | 0.64 | 24.77 |
| O2 | mol/min | 0.00 | 0.00 |
| N2 | mol/min | 0.00 | 0.00 |
| CH4 | mol/min | 0.00 | 31.54 |
| CO2 | mol/min | 0.00 | 13.80 |
| CO | mol/min | 0.00 | 0.58 |
| PROPANE | mol/min | 6.56 | 0.00 |
| BUTANE | mol/min | 6.56 | 0.00 |
| Mole Fractions | | | |
| WATER | | 91% | 61% |
| H2 | | 0% | 14% |
| O2 | | 0% | 0% |
| N2 | | 0% | 0% |
| CH4 | | 0% | 17% |
| CO2 | | 0% | 8% |
| CO | | 0% | 0% |
| PROPANE | | 4% | 0% |

TABLE 1-continued

Pre-reformer operation at S/C = 3

|  | Units | PRE-IN | MEMBR-IN |
|---|---|---|---|
| BUTANE |  | 4% | 0% |

TABLE 2

Membrane operation at S/C = 3

|  | Units | MEMBR-IN | RETENTAT | DEPRERET | H2PERM | H2PERM2 |
|---|---|---|---|---|---|---|
| Temperature | °C. | 494.23 | 494.23 | 494.23 | 494.23 | 494.23 |
| Pressure | bar | 10.00 | 10.00 | 1.05 | 10.00 | 1.02 |
| Mole Flows |  |  |  |  |  |  |
| WATER | mol/min | 109.58 | 109.58 | 109.58 | 0.00 | 0.00 |
| H2 | mol/min | 24.77 | 4.95 | 4.95 | 19.82 | 19.82 |
| O2 | mol/min | 0.00 | 0.00 | 0.00 | 0.00 | 0.00 |
| N2 | mol/min | 0.00 | 0.00 | 0.00 | 0.00 | 0.00 |
| CH4 | mol/min | 31.54 | 31.54 | 31.54 | 0.00 | 0.00 |
| CO2 | mol/min | 13.80 | 13.80 | 13.80 | 0.00 | 0.00 |
| CO | mol/min | 0.58 | 0.58 | 0.58 | 0.00 | 0.00 |
| PROPANE | mol/min | 0.00 | 0.00 | 0.00 | 0.00 | 0.00 |
| BUTANE | mol/min | 0.00 | 0.00 | 0.00 | 0.00 | 0.00 |
| Mole Fractions |  |  |  |  |  |  |
| WATER |  | 61% | 68% | 68% | 0% | 0% |
| H2 |  | 14% | 3% | 3% | 100% | 100% |
| O2 |  | 0% | 0% | 0% | 0% | 0% |
| N2 |  | 0% | 0% | 0% | 0% | 0% |
| CH4 |  | 17% | 20% | 20% | 0% | 0% |
| CO2 |  | 8% | 9% | 9% | 0% | 0% |
| CO |  | 0% | 0% | 0% | 0% | 0% |
| PROPANE |  | 0% | 0% | 0% | 0% | 0% |
| BUTANE |  | 0% | 0% | 0% | 0% | 0% |

TABLE 3

Solid Oxide Fuel Cell operation at S/C = 3

|  | Units | ANO-IN | ANO-OUT |
|---|---|---|---|
| Temperature | °C. | 421.64 | 750.00 |
| Pressure | bar | 1.05 | 1.05 |
| Mole Flows |  |  |  |
| WATER | mol/min | 109.58 | 161.15 |
| H2 | mol/min | 4.95 | 16.46 |
| O2 | mol/min | 0.00 | 0.00 |
| N2 | mol/min | 0.00 | 0.00 |
| CH4 | mol/min | 31.54 | 0.00 |
| CO2 | mol/min | 13.80 | 42.63 |
| CO | mol/min | 0.58 | 3.29 |
| PROPANE | mol/min | 0.00 | 0.00 |
| BUTANE | mol/min | 0.00 | 0.00 |
| Mole Fractions |  |  |  |
| WATER |  | 68% | 72% |
| H2 |  | 3% | 7% |
| O2 |  | 0% | 0% |
| N2 |  | 0% | 0% |
| CH4 |  | 20% | 0% |
| CO2 |  | 9% | 19% |
| CO |  | 0% | 1% |
| PROPANE |  | 0% | 0% |
| BUTANE |  | 0% | 0% |

TABLE 4

Pre-reformer operation at S/C = 4

|  | Units | PRE-IN | MEMBR-IN |
|---|---|---|---|
| Temperature | °C. | 579.50 | 492.69 |
| Pressure | bar | 10.00 | 10.00 |
| Mole Flows |  |  |  |
| WATER | mol/min | 183.67 | 152.29 |
| H2 | mol/min | 0.64 | 31.18 |
| O2 | mol/min | 0.00 | 0.00 |
| N2 | mol/min | 0.00 | 0.00 |
| CH4 | mol/min | 0.00 | 29.94 |
| CO2 | mol/min | 0.00 | 15.40 |
| CO | mol/min | 0.00 | 0.58 |
| PROPANE | mol/min | 6.56 | 0.00 |
| BUTANE | mol/min | 6.56 | 0.00 |
| Mole Fractions |  |  |  |
| WATER |  | 93% | 66% |
| H2 |  | 0% | 14% |
| O2 |  | 0% | 0% |
| N2 |  | 0% | 0% |
| CH4 |  | 0% | 13% |
| CO2 |  | 0% | 7% |
| CO |  | 0% | 0% |
| PROPANE |  | 3% | 0% |
| BUTANE |  | 3% | 0% |

TABLE 5

Membrane operation at S/C = 4

| | Units | MEMBR-IN | RETENTAT | DEPRERET | H2PERM | H2PERM2 |
|---|---|---|---|---|---|---|
| Temperature | °C. | 492.69 | 492.69 | 492.69 | 492.69 | 492.69 |
| Pressure | bar | 10.00 | 10.00 | 1.05 | 10.00 | 1.02 |
| Mole Flows | | | | | | |
| WATER | mol/min | 152.29 | 152.29 | 152.29 | 0.00 | 0.00 |
| H2 | mol/min | 31.18 | 6.24 | 6.24 | 24.94 | 24.94 |
| O2 | mol/min | 0.00 | 0.00 | 0.00 | 0.00 | 0.00 |
| N2 | mol/min | 0.00 | 0.00 | 0.00 | 0.00 | 0.00 |
| CH4 | mol/min | 29.94 | 29.94 | 29.94 | 0.00 | 0.00 |
| CO2 | mol/min | 15.40 | 15.40 | 15.40 | 0.00 | 0.00 |
| CO | mol/min | 0.58 | 0.58 | 0.58 | 0.00 | 0.00 |
| PROPANE | mol/min | 0.00 | 0.00 | 0.00 | 0.00 | 0.00 |
| BUTANE | mol/min | 0.00 | 0.00 | 0.00 | 0.00 | 0.00 |
| Mole Fractions | | | | | | |
| WATER | | 66% | 74% | 74% | 0% | 0% |
| H2 | | 14% | 3% | 3% | 100% | 100% |
| O2 | | 0% | 0% | 0% | 0% | 0% |
| N2 | | 0% | 0% | 0% | 0% | 0% |
| CH4 | | 13% | 15% | 15% | 0% | 0% |
| CO2 | | 7% | 8% | 8% | 0% | 0% |
| CO | | 0% | 0% | 0% | 0% | 0% |
| PROPANE | | 0% | 0% | 0% | 0% | 0% |
| BUTANE | | 0% | 0% | 0% | 0% | 0% |

TABLE 6

Solid Oxide Fuel Cell operation at S/C = 4

| | Units | ANO-IN | ANO-OUT |
|---|---|---|---|
| Temperature | C. | 434.20 | 750.00 |
| Pressure | bar | 1.05 | 1.05 |
| Mole Flows | | | |
| WATER | mol/min | 152.29 | 202.07 |
| H2 | mol/min | 6.24 | 16.34 |
| O2 | mol/min | 0.00 | 0.00 |
| N2 | mol/min | 0.00 | 0.00 |
| CH4 | mol/min | 29.94 | 0.00 |
| CO2 | mol/min | 15.40 | 43.27 |
| CO | mol/min | 0.58 | 2.65 |
| PROPANE | mol/min | 0.00 | 0.00 |
| BUTANE | mol/min | 0.00 | 0.00 |
| Mole Fractions | | | |
| WATER | | 74% | 76% |
| H2 | | 3% | 6% |
| O2 | | 0% | 0% |
| N2 | | 0% | 0% |
| CH4 | | 15% | 0% |
| CO2 | | 8% | 16% |
| CO | | 0% | 1% |
| PROPANE | | 0% | 0% |
| BUTANE | | 0% | 0% |

TABLE 7

Products after pre-reformer (without H2O) at S/C = 3

| H2 | O2 | N2 | CH4 | CO2 | CO | PROPANE | BUTANE |
|---|---|---|---|---|---|---|---|
| 35.04% | 0.00% | 0.00% | 44.62% | 19.52% | 0.81% | 0.00% | 0.00% |

TABLE 8

Operation of pre-reformer at S/C = 3

| | Units | PRE-IN | AFT-PRE |
|---|---|---|---|
| Temperature | C. | 563.06 | 494.23 |
| Pressure | bar | 10.00 | 10.00 |
| Mole Flows | | | |
| WATER | mol/min | 137.75 | 109.58 |
| H2 | mol/min | 0.64 | 24.77 |
| O2 | mol/min | 0.00 | 0.00 |
| N2 | mol/min | 0.00 | 0.00 |
| CH4 | mol/min | 0.00 | 31.54 |
| CO2 | mol/min | 0.00 | 13.80 |
| CO | mol/min | 0.00 | 0.58 |
| PROPANE | mol/min | 6.56 | 0.00 |
| BUTANE | mol/min | 6.56 | 0.00 |
| Mole Fractions | | | |
| WATER | | 91% | 61% |
| H2 | | 0% | 14% |
| O2 | | 0% | 0% |
| N2 | | 0% | 0% |
| CH4 | | 0% | 17% |
| CO2 | | 0% | 8% |
| CO | | 0% | 0% |
| PROPANE | | 4% | 0% |
| BUTANE | | 4% | 0% |

Figure 6:
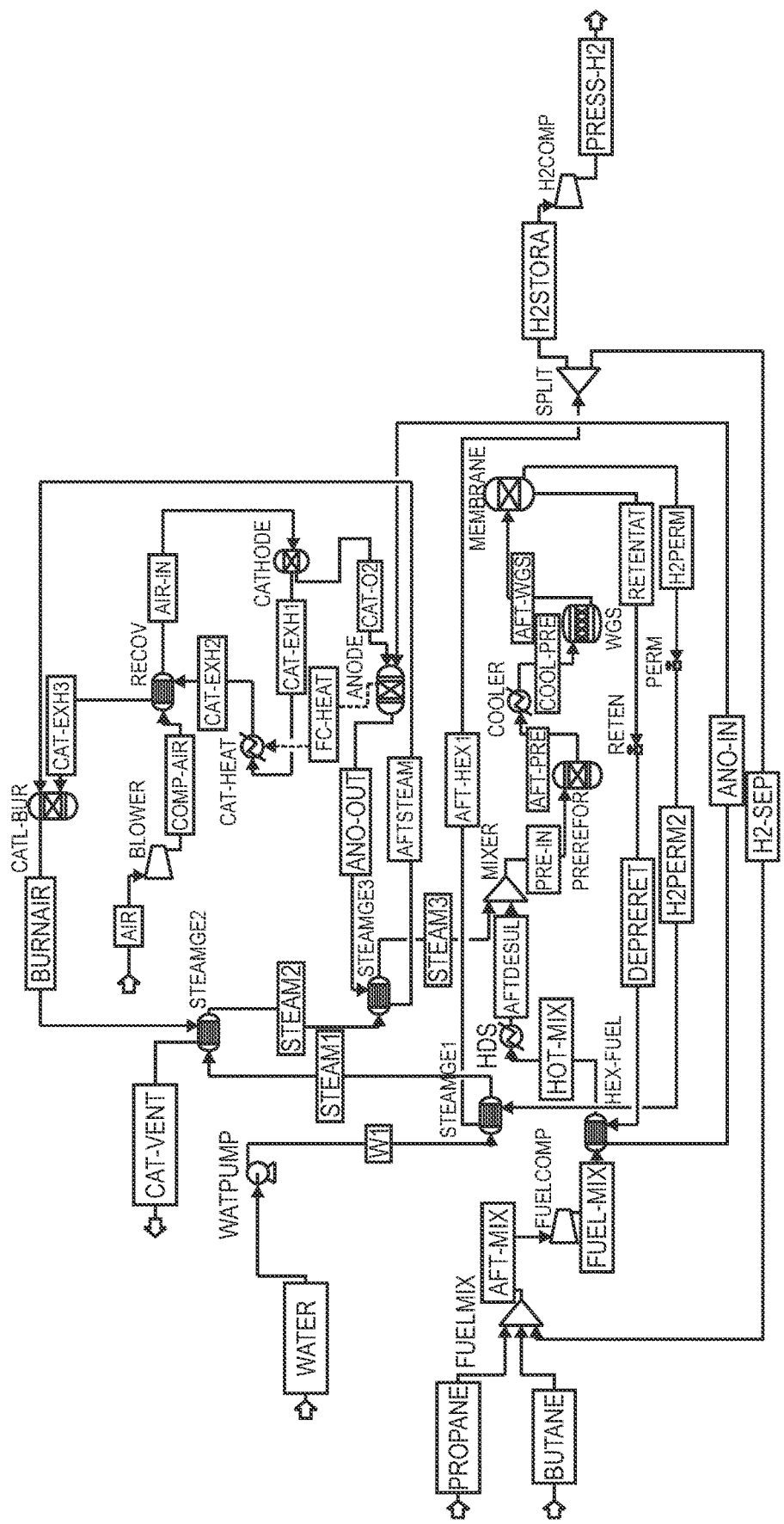
FIG. 6 is a simplified process model of a trigeneration facility that incorporates a hydrogen membrane separator integrated with a water-gas shift reactor.

FIG. 6 is a simplified process model of a trigeneration facility that incorporates a hydrogen membrane separator with an integrated water gas shift reactor. In the simulations based on the trigeneration facility of FIG. 6, the pre-reformer is run at a temperature of 493° C. and a pressure of 10 bar. The results of the modeling of the system for S/C=3 with a water-gas shift reaction present before the hydrogen separation membrane are shown in Tables 7 to 12.

TABLE 9

Operation of water gas shift unit at S/C = 3

|  | Units | COOL-PRE | AFT-WGS |
|---|---|---|---|
| Temperature | C. | 400.00 | 402.95 |
| Pressure | bar | 10.00 | 10.00 |
| Mole Flows | | | |
| WATER | mol/min | 109.58 | 109.01 |
| H2 | mol/min | 24.77 | 25.33 |
| O2 | mol/min | 0.00 | 0.00 |
| N2 | mol/min | 0.00 | 0.00 |
| CH4 | mol/min | 31.54 | 31.54 |
| CO2 | mol/min | 13.80 | 14.36 |
| CO | mol/min | 0.58 | 0.01 |
| PROPANE | mol/min | 0.00 | 0.00 |
| BUTANE | mol/min | 0.00 | 0.00 |
| Mole Fractions | | | |
| WATER | | 61% | 60% |
| H2 | | 14% | 14% |
| O2 | | 0% | 0% |
| N2 | | 0% | 0% |
| CH4 | | 17% | 17% |
| CO2 | | 8% | 8% |
| CO | | 0% | 0% |
| PROPANE | | 0% | 0% |
| BUTANE | | 0% | 0% |

TABLE 10

Operation of membrane at S/C = 3

|  | Units | AFT-WGS | RETENTAT | DEPRERET | H2PERM | H2PERM2 |
|---|---|---|---|---|---|---|
| Temperature | C. | 402.95 | 402.95 | 402.95 | 402.95 | 402.95 |
| Pressure | bar | 10.00 | 10.00 | 1.05 | 10.00 | 1.02 |
| Mole Flows | | | | | | |
| WATER | mol/min | 109.01 | 109.01 | 109.01 | 0.00 | 0.00 |
| H2 | mol/min | 25.33 | 5.07 | 5.07 | 20.27 | 20.27 |
| O2 | mol/min | 0.00 | 0.00 | 0.00 | 0.00 | 0.00 |
| N2 | mol/min | 0.00 | 0.00 | 0.00 | 0.00 | 0.00 |
| CH4 | mol/min | 31.54 | 31.54 | 31.54 | 0.00 | 0.00 |
| CO2 | mol/min | 14.36 | 14.36 | 14.36 | 0.00 | 0.00 |
| CO | mol/min | 0.01 | 0.01 | 0.01 | 0.00 | 0.00 |
| PROPANE | mol/min | 0.00 | 0.00 | 0.00 | 0.00 | 0.00 |
| BUTANE | mol/min | 0.00 | 0.00 | 0.00 | 0.00 | 0.00 |
| Mole Fractions | | | | | | |
| WATER | | 60% | 68% | 68% | 0% | 0% |
| H2 | | 14% | 3% | 3% | 100% | 100% |
| O2 | | 0% | 0% | 0% | 0% | 0% |
| N2 | | 0% | 0% | 0% | 0% | 0% |
| CH4 | | 17% | 20% | 20% | 0% | 0% |
| CO2 | | 8% | 9% | 9% | 0% | 0% |
| CO | | 0% | 0% | 0% | 0% | 0% |
| PROPANE | | 0% | 0% | 0% | 0% | 0% |
| BUTANE | | 0% | 0% | 0% | 0% | 0% |

TABLE 11

Operation of solid oxide fuel cell at S/C = 3

|  | Units | ANO-IN | ANO-OUT |
|---|---|---|---|
| Temperature | C. | 400.00 | 750.00 |
| Pressure | bar | 1.05 | 1.05 |
| Mole Flows | | | |
| WATER | mol/min | 109.01 | 160.77 |
| H2 | mol/min | 5.07 | 16.40 |
| O2 | mol/min | 0.00 | 0.00 |
| N2 | mol/min | 0.00 | 0.00 |
| CH4 | mol/min | 31.54 | 0.00 |
| CO2 | mol/min | 14.36 | 42.63 |
| CO | mol/min | 0.01 | 3.29 |
| PROPANE | mol/min | 0.00 | 0.00 |
| BUTANE | mol/min | 0.00 | 0.00 |
| Mole Fractions | | | |
| WATER | | 68% | 72% |
| H2 | | 3% | 7% |
| O2 | | 0% | 0% |
| N2 | | 0% | 0% |
| CH4 | | 20% | 0% |
| CO2 | | 9% | 19% |
| CO | | 0% | 1% |
| PROPANE | | 0% | 0% |
| BUTANE | | 0% | 0% |

TABLE 12

Productivity of system at S/C = 3

| FU* | PROPANE (MOL/MIN) | BUTANE (MOL/MIN) | SOFC Stack POWER (KW) | SOFCV (VOLT) | SOFCEFF (%) | REQPOW (KW) | SOFCELC (KW) | H2 Prod (KG/DAY) | SYSTEM EFF (%) | H2 Prod. Eff (%) | ELEC EFF (%) |
|---|---|---|---|---|---|---|---|---|---|---|---|
| 0.85 | 6.56 | 6.56 | 255.40 | 0.71 | 65.00 | 23.14 | 224.60 | 56.98 | 57.09 | 28.12 | 48.44 |

*FU is fuel utilization.

The results of the modeling of the system for S/C=4 with a water-gas shift reaction present before the hydrogen separation membrane are shown in Tables 13 to 18.

TABLE 13

Products after pre-reformer (without H2O) at S/C = 4

| H2 | O2 | N2 | CH4 | CO2 | CO | PROPANE | BUTANE |
|---|---|---|---|---|---|---|---|
| 40.44% | 0.00% | 0.00% | 38.84% | 19.98% | 0.75% | 0.00% | 0.00% |

TABLE 14

Operation of pre-reformer at S/C = 4

| | Units | PRE-IN | AFT-PRE |
|---|---|---|---|
| Temperature | C. | 579.50 | 492.69 |
| Pressure | bar | 10.00 | 10.00 |
| Mole Flows | | | |
| WATER | mol/min | 183.67 | 152.29 |
| H2 | mol/min | 0.64 | 31.18 |
| O2 | mol/min | 0.00 | 0.00 |
| N2 | mol/min | 0.00 | 0.00 |
| CH4 | mol/min | 0.00 | 29.94 |
| CO2 | mol/min | 0.00 | 15.40 |
| CO | mol/min | 0.00 | 0.58 |
| PROPANE | mol/min | 6.56 | 0.00 |
| BUTANE | mol/min | 6.56 | 0.00 |
| Mole Fractions | | | |
| WATER | | 93% | 66% |
| H2 | | 0% | 14% |
| O2 | | 0% | 0% |
| N2 | | 0% | 0% |
| CH4 | | 0% | 13% |
| CO2 | | 0% | 7% |
| CO | | 0% | 0% |
| PROPANE | | 3% | 0% |
| BUTANE | | 3% | 0% |

TABLE 15

Operation of water gas shift unit at S/C = 4

| | Units | COOL-PRE | AFT-WGS |
|---|---|---|---|
| Temperature | C. | 400.00 | 402.37 |
| Pressure | bar | 10.00 | 10.00 |
| Mole Flows | | | |
| WATER | mol/min | 152.29 | 151.73 |
| H2 | mol/min | 31.18 | 31.74 |
| O2 | mol/min | 0.00 | 0.00 |
| N2 | mol/min | 0.00 | 0.00 |
| CH4 | mol/min | 29.94 | 29.94 |
| CO2 | mol/min | 15.40 | 15.97 |
| CO | mol/min | 0.58 | 0.01 |
| PROPANE | mol/min | 0.00 | 0.00 |
| BUTANE | mol/min | 0.00 | 0.00 |
| Mole Fractions | | | |
| WATER | | 66% | 66% |
| H2 | | 14% | 14% |
| O2 | | 0% | 0% |
| N2 | | 0% | 0% |
| CH4 | | 13% | 13% |
| CO2 | | 7% | 7% |
| CO | | 0% | 0% |
| PROPANE | | 0% | 0% |
| BUTANE | | 0% | 0% |

TABLE 16

Operation of membrane at S/C = 4

| | Units | AFT-WGS | RETENTAT | DEPRERET | H2PERM | H2PERM2 |
|---|---|---|---|---|---|---|
| Temperature | C. | 402.37 | 402.37 | 402.37 | 402.37 | 402.37 |
| Pressure | bar | 10.00 | 10.00 | 1.05 | 10.00 | 1.02 |
| Mole Flows | | | | | | |
| WATER | mol/min | 151.73 | 151.73 | 151.73 | 0.00 | 0.00 |
| H2 | mol/min | 31.74 | 6.35 | 6.35 | 25.39 | 25.39 |
| O2 | mol/min | 0.00 | 0.00 | 0.00 | 0.00 | 0.00 |
| N2 | mol/min | 0.00 | 0.00 | 0.00 | 0.00 | 0.00 |
| CH4 | mol/min | 29.94 | 29.94 | 29.94 | 0.00 | 0.00 |
| CO2 | mol/min | 15.97 | 15.97 | 15.97 | 0.00 | 0.00 |
| CO | mol/min | 0.01 | 0.01 | 0.01 | 0.00 | 0.00 |
| PROPANE | mol/min | 0.00 | 0.00 | 0.00 | 0.00 | 0.00 |

TABLE 16-continued

Operation of membrane at S/C = 4

| | Units | AFT-WGS | RETENTAT | DEPRERET | H2PERM | H2PERM2 |
|---|---|---|---|---|---|---|
| BUTANE | mol/min | 0.00 | 0.00 | 0.00 | 0.00 | 0.00 |
| | | | Mole Fractions | | | |
| WATER | | 66% | 74% | 74% | 0% | 0% |
| H2 | | 14% | 3% | 3% | 100% | 100% |
| O2 | | 0% | 0% | 0% | 0% | 0% |
| N2 | | 0% | 0% | 0% | 0% | 0% |
| CH4 | | 13% | 15% | 15% | 0% | 0% |
| CO2 | | 7% | 8% | 8% | 0% | 0% |
| CO | | 0% | 0% | 0% | 0% | 0% |
| PROPANE | | 0% | 0% | 0% | 0% | 0% |

TABLE 17

Operation of solid oxide fuel cell at S/C = 4

| | Units | ANO-IN | ANO-OUT |
|---|---|---|---|
| Temperature | C. | 400.00 | 750.00 |
| Pressure | bar | 1.05 | 1.05 |
| | Mole Flows | | |
| WATER | mol/min | 151.73 | 201.68 |
| H2 | mol/min | 6.35 | 16.28 |
| O2 | mol/min | 0.00 | 0.00 |
| N2 | mol/min | 0.00 | 0.00 |
| CH4 | mol/min | 29.94 | 0.00 |
| CO2 | mol/min | 15.97 | 43.28 |
| CO | mol/min | 0.01 | 2.64 |
| PROPANE | mol/min | 0.00 | 0.00 |
| BUTANE | mol/min | 0.00 | 0.00 |
| | Mole Fractions | | |
| WATER | | 74% | 76% |
| H2 | | 3% | 6% |
| O2 | | 0% | 0% |
| N2 | | 0% | 0% |
| CH4 | | 15% | 0% |
| CO2 | | 8% | 16% |
| CO | | 0% | 1% |
| PROPANE | | 0% | 0% |
| BUTANE | | 0% | 0% |

TABLE 18

Productivity of system at S/C = 4

| FU* | PROPANE (MOL/MIN) | BUTANE (MOL/MIN) | SOFC Stack POWER (KW) | SOFC V (VOLT) | SOFCEFF (%) | REQPOW (KW) | SOFCELC (KW) | H2 Prod (KG/DAY) | SYSTEM EFF (%) | H2 Prod Eff (%) | ELEC EFF (%) |
|---|---|---|---|---|---|---|---|---|---|---|---|
| 0.85 | 6.56 | 6.56 | 247.04 | 0.72 | 65.00 | 27.06 | 212.57 | 71.85 | 59.32 | 34.23 | 48.39 |

*FU is the fuel utilization.

EXEMPLARY EMBODIMENTS

An embodiment described herein provides a method for coproduction of hydrogen, electrical power, and heat energy. The method includes desulfurizing a feed stream to form a desulfurized feed stream, reforming the desulfurized feed stream to form a methane rich gas, and providing the methane rich gas to a membrane separator. A hydrogen stream is produced in a permeate from the membrane separator. A retentate stream from the membrane separator is provided to a solid oxide fuel cell (SOFC). Electrical power is produced in the SOFC from the retentate stream.

In an aspect, the method includes blending hydrogen with the feed stream prior to desulfurizing the feed stream. In an aspect, a portion of the hydrogen stream is mixed with the feed stream prior to desulfurizing the feed stream. In an aspect, the method includes desulfurizing the feed stream in an adsorption unit.

In an aspect, the method includes compressing the hydrogen stream for use as a product. In an aspect, the method includes heating the retentate stream to an operating temperature for the SOFC prior to providing the retentate stream to the SOFC.

In an aspect, the method includes utilizing heat produced in the SOFC. In an aspect, the method includes heating the retentate stream with heat produced in the SOFC. In an aspect, the method includes generating steam with the heat produced in the SOFC.

Another embodiment described herein provides a trigeneration facility. The trigeneration facility includes a desulfurization unit to remove sulfur from a hydrocarbon feed stream forming a desulfurized feed stream. A pre-reformer is included to convert the desulfurized feed stream to a methane rich gas. A membrane separator is included to remove at least a portion of hydrogen from the methane rich gas in a permeate. A solid oxide fuel cell (SOFC) is included to generate electrical power from a retentate from the membrane separator.

In an aspect, the trigeneration facility includes a heat exchanger to utilize heat energy from the SOFC. In an aspect, the trigeneration facility includes a heat exchanger to heat the retentate to an operating temperature of the SOFC.

In an aspect, the pre-reformer includes a steam reformer including a nickel catalyst. In an aspect, the pre-reformer operates at a temperature between about 300° C. and about 550° C. in an aspect, the steam reformer operates at a pressure of between about 2 bar and about 30 bar.

In an aspect, the trigeneration facility includes a water-gas shift catalyst to increase the amount of hydrogen in the methane rich gas. In an aspect, the water-gas shift catalyst includes iron oxides or copper oxides.

In an aspect, the membrane separator is a high-temperature hydrogen selective membrane. In an aspect, the membrane separator includes palladium, or a palladium alloy, or both. In an aspect, the membrane separator includes a carbon-based membrane, or a zeolite based membrane, or both. In an aspect, the membrane separator includes an integrated water-gas shift catalyst. In an aspect, the membrane separator includes a proton conducting material, which is be electrically driven to transport the hydrogen to the permeation side.

In an aspect, the feed stream includes propane, or butane, or both. In an aspect, the feed stream includes liquefied natural gas. In an aspect, the feed stream includes a raw natural gas.

Other implementations are also within the scope of the following claims.

What is claimed is:

1. A trigeneration facility, comprising:
a desulfurization unit to remove sulfur from a hydrocarbon feed stream forming a desulfurized feed stream, the desulfurization unit comprising a desulfurization catalyst, the desulfurization catalyst comprising a gamma alumina based support, at least one catalytic metal from group VI, at least one catalytic metal from group VIII, and at least one dopant selected from a group consisting of boron, phosphorous, halogen, and silicon;
a pre-reformer to convert the desulfurized feed stream to a methane rich gas, the pre-reformer comprising a steam reformer comprising a nickel catalyst;
a membrane separator to remove at least a portion of hydrogen from the methane rich gas in a permeate, the membrane separator comprising a water-gas shift catalyst to increase an amount of hydrogen in the methane rich gas;
a pressure swing adsorption unit to purify hydrogen in the permeate, providing a purified stream;
a compressed hydrogen stream of about 400 bar to about 900 bar, wherein the compressed hydrogen stream is a fuel stream to a fuel cell vehicle from the purified stream; and
a solid oxide fuel cell (SOFC) to generate electrical power and heat from a retentate from the membrane separator, wherein the retentate comprises methane.

2. The trigeneration facility of claim 1, comprising a heat exchanger to utilize the generated heat.

3. The trigeneration facility of claim 1, comprising a heat exchanger to heat the retentate, using the generated heat, to an operating temperature of the SOFC.

4. The trigeneration facility of claim 1, wherein the pre-reformer operates at a temperature between about 300° C. and about 550° C.

5. The trigeneration facility of claim 1, wherein the steam reformer operates at a pressure of between about 2 bar and about 30 bar.

6. The trigeneration facility of claim 1, wherein the water-gas shift catalyst comprises iron oxides or copper oxides.

7. The trigeneration facility of claim 1, wherein the membrane separator is a high-temperature hydrogen selective membrane.

8. The trigeneration facility of claim 7, wherein the membrane separator comprises palladium, or a palladium alloy, or both.

9. The trigeneration facility of claim 7, wherein the membrane separator comprises a carbon-based membrane, or a zeolite based membrane, or both.

10. The trigeneration facility of claim 1, wherein the membrane separator comprises an integrated water-gas shift catalyst.

11. The trigeneration facility of claim 1, wherein the membrane separator comprises a proton conducting material, which is electrically driven to transport the hydrogen to the permeation side.

12. The trigeneration facility of claim 1, wherein the feed stream comprises propane, or butane, or both.

13. The trigeneration facility of claim 1, wherein the feed stream comprises liquefied natural gas.

14. The trigeneration facility of claim 1, wherein the feed stream comprises a raw natural gas.

15. A trigeneration facility, comprising:
a desulfurization unit to remove sulfur from a hydrocarbon feed stream forming a desulfurized feed stream;
a pre-reformer to convert the desulfurized feed stream to a methane rich gas;
a membrane separator to remove at least a portion of hydrogen from the methane rich gas in a permeate, the membrane separator comprising a water-gas shift catalyst to increase an amount of hydrogen in the methane rich gas;
a compressed hydrogen stream of about 400 bar to about 900 bar, wherein the compressed hydrogen stream is a fuel stream to a fuel cell vehicle from the trigeneration facility; and
a solid oxide fuel cell (SOFC) to generate electrical power and heat from a retentate from the membrane separator, wherein the retentate comprises methane.

16. A trigeneration facility, comprising:
a desulfurization unit operating at a temperature between about 300° C. and about 550° C. to remove sulfur from a hydrocarbon feed stream forming a desulfurized feed stream;
a pre-reformer operating at a temperature between about 300° C. and about 550° C. to convert the desulfurized feed stream to a methane rich gas;
a membrane separator operating at a temperature between about 300° C. and about 550° C. to remove at least a portion of hydrogen from the methane rich gas in a permeate, the membrane separator comprising a water-gas shift catalyst to increase an amount of hydrogen in the methane rich gas;
a compressed hydrogen stream of about 400 bar to about 900 bar, wherein the compressed hydrogen stream is a fuel stream to a fuel cell vehicle from the trigeneration facility; and
a solid oxide fuel cell (SOFC) to generate electrical power and heat from a retentate from the membrane separator, wherein the retentate comprises methane.

* * * * *